US012786410B2

(12) United States Patent
Wang et al.

(10) Patent No.: US 12,786,410 B2
(45) Date of Patent: Nov. 3, 2026

(54) METHODS AND NON-TRANSITORY COMPUTER READABLE STORAGE MEDIUM FOR ADAPTIVE SPATIAL RESAMPLING TOWARDS MACHINE VISION

(71) Applicant: Alibaba (China) Co., Ltd., Hangzhou (CN)

(72) Inventors: Shurun Wang, Beijing (CN); Yan Ye, San Diego, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 36 days.

(21) Appl. No.: 18/882,019

(22) Filed: Sep. 11, 2024

(65) Prior Publication Data

US 2025/0113037 A1 Apr. 3, 2025

Related U.S. Application Data

(60) Provisional application No. 63/587,249, filed on Oct. 2, 2023.

(51) Int. Cl.
*H04N 19/132* (2014.01)
*H04N 19/172* (2014.01)

(52) U.S. Cl.
CPC ......... *H04N 19/132* (2014.11); *H04N 19/172* (2014.11)

(58) Field of Classification Search
CPC ..... H04N 19/132; H04N 19/172; H04N 19/59
See application file for complete search history.

(56) References Cited

U.S. PATENT DOCUMENTS

2020/0404297 A1 12/2020 Sarwer et al.
2021/0099722 A1 4/2021 Da Silva Pratas Gabriel et al.
2021/0203950 A1* 7/2021 Kottke ................ H04N 19/154
2025/0045968 A1* 2/2025 Guleryuz ................ G06N 3/09

FOREIGN PATENT DOCUMENTS

CN 111066327 A 4/2020
CN 114915783 A 8/2022
WO 2021058638 A1 4/2021

OTHER PUBLICATIONS

Lin et al., "Adaptive Downsampling to Improve Image Compression at Low Bit Rates," IEEE Transactions on Image Processing, vol. 15, No. 9, Sep. 2006, pp. 2513-2521.
Liu et al., "Compressive Sampling-Based Image Coding for Resource-Deficient Visual Communication," IEEE Transactions on Image Processing, vol. 25, No. 6, Jun. 2016, pp. 2844-2855.

(Continued)

*Primary Examiner* — Hesham K Abouzahra
(74) *Attorney, Agent, or Firm* — Finnegan, Henderson, Farabow, Garrett & Dunner, LLP

(57) ABSTRACT

A method of encoding a video sequence into a bitstream, the method includes receiving a video sequence comprising a plurality of pictures; determining one or more spatial information features of the video sequence corresponding to various resolution; performing spatial resampling on the video sequence according to the one or more spatial information features and a pre-trained cluster model; and encoding the spatial resampled video sequence into the bitstream.

19 Claims, 13 Drawing Sheets

(56) References Cited

OTHER PUBLICATIONS

Liu et al. "[VCM] response to VCM call for proposals—an EVC based solution," International Organisation for Standardisation Organisation Internationale De Normalisation ISO/IEC JTC 1/SC 29/WG 2 MPEG Technical Requirements, ISO/IEC JTC 1/SC 29/WG 2 m60779, 14 pages, 2022.
VQEG/siti-tools: SI TI calculation tools (github.com), 8 pages.
Wang et al., "[VCM] Video Coding for Machines CfP Response from Alibaba and City University of Hong Kong," International Organisation for Standardisation Organisation Internationale De Normalisation ISO/IEC JTC 1/SC 29/WG 2 MPEG Technical Requirements, ISO/IEC JTC 1/SC 29/WG 2 m60737, 16 pages, 2022.
Lu et al., [EE] Tests on Decomposition, Compression, Synthesis (DCS)-based Technology, JVET-U0096, 21st Meeting, by teleconference, Jan. 6-15, 2021, 9 pages.
PCT International Search Report and Written Opinion mailed Dec. 23, 2024, issued in corresponding International Application No. PCT/CN2024/123078 (9 pages).

* cited by examiner

300A

METHODS AND NON-TRANSITORY COMPUTER READABLE STORAGE MEDIUM FOR ADAPTIVE SPATIAL RESAMPLING TOWARDS MACHINE VISION

CROSS-REFERENCE TO RELATED APPLICATIONS

The disclosure claims the benefits of priority to U.S. Provisional Application No. 63/587,249, filed on Oct. 2, 2023, which is incorporated herein by reference in its entirety.

TECHNICAL FIELD

The present disclosure generally relates to image or video processing, and more particularly, to methods and a non-transitory computer readable storage medium for performing adaptive spatial resampling towards machine vision.

BACKGROUND

With the rise of machine learning technologies and machine vision applications, the amount of videos and images (collectively referred to as “image data”) consumed by machines has been rapidly growing. Typical use cases include autonomous driving, intelligent transportation, smart city, intelligent content management, etc., which incorporate machine vision tasks such as object detection, instance segmentation, and object tracking.

Due to the large volume of image data required by machine vision tasks, it is essential to compress the image data for efficient transmission and storage. However, conventional image/video compression techniques have been focusing on ensuring the image/video quality as perceived by humans, yet machines consume and understand visual data differently to human vision. As a result, the image/video compression techniques suitable for machine vision could be different from the conventional one. New compression techniques are therefore needed to achieve optimized performance for machine usage.

SUMMARY

Embodiments of the present disclosure provide a method of encoding a video sequence into a bitstream. The method includes receiving a video sequence comprising a plurality of pictures; determining one or more spatial information features of the video sequence corresponding to various resolution; performing spatial resampling on the video sequence according to the one or more spatial information features and a pre-trained cluster model; and encoding the spatial resampled video sequence into the bitstream.

Embodiments of the present disclosure provide a method of decoding a bitstream to output one or more pictures for a video stream. The method includes receiving a bitstream; decoding, using coded information of the one or more bitstreams, a plurality of pictures; decoding a parameter indicating a resampling ratio; and performing spatial resampling of the plurality of pictures with the resampling ratio; wherein the resampling ratio is determined according to one or more spatial information features of a video sequence and a pre-trained cluster model.

Embodiments of the present disclosure provide a non-transitory computer readable storage medium storing a bitstream of a video for processing according to operations comprising: determining one or more spatial information feature of a video sequence corresponding to various resolution; performing spatial resampling on the video sequence according to the one or more spatial information features and a pre-trained cluster model; and encoding the spatial resampled video sequence into the bitstream.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims. Particular aspects of the present disclosure are described in greater detail below. The terms and definitions provided herein control, if in conflict with terms or definitions incorporated by reference.

The present disclosure is directed to "Video Coding for Machines" (VCM), which aims at compressing input videos and images or feature maps for machine vision tasks. The disclosed techniques are suitable for compressing image data used by any machine vision tasks, such as object recognition and tracking, face recognition, image/video search, mobile augmented reality (MAR), autonomous vehicles, Internet of Things (IoT), images matching, 3-dimension structure construction, stereo correspondence, motion tracking, etc.

Figure 1:
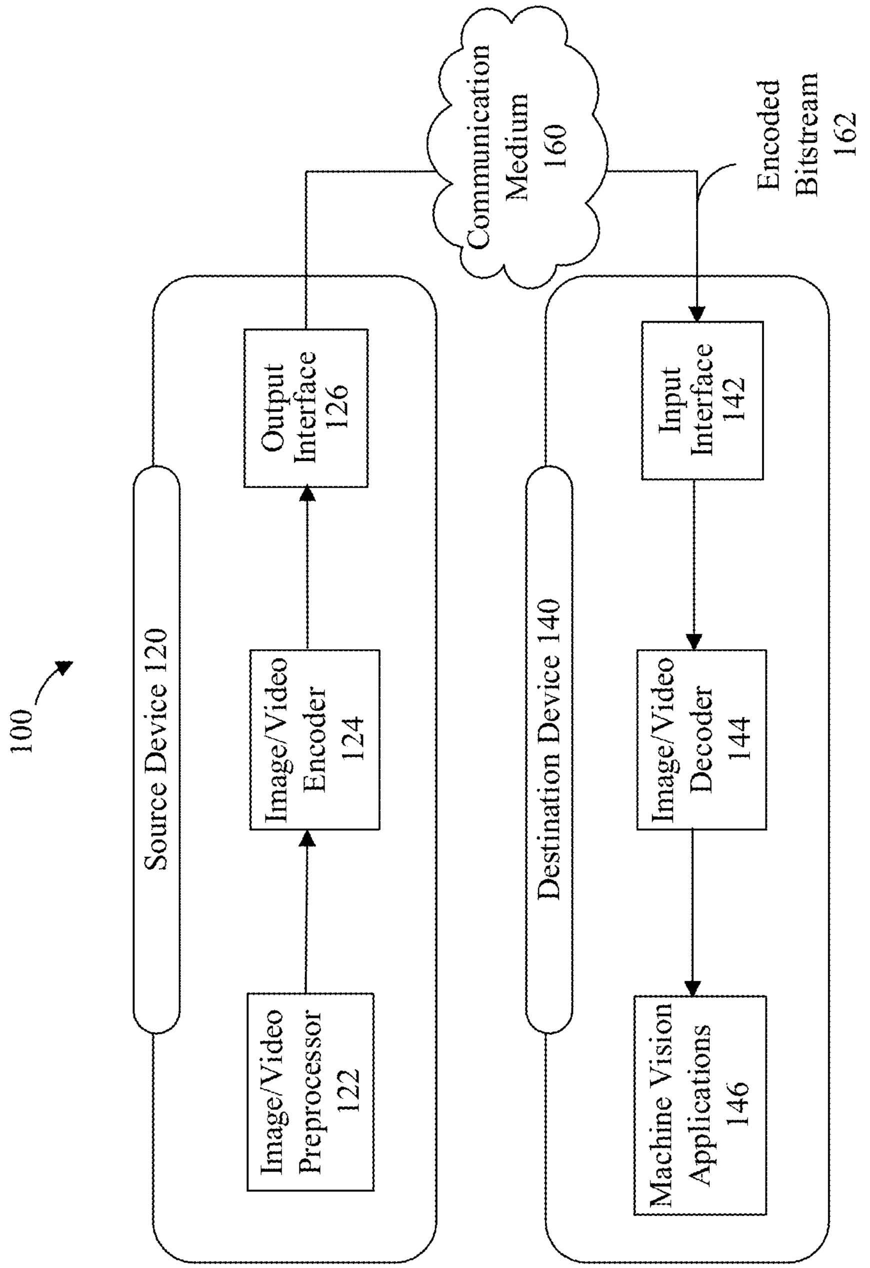
FIG. 1 is a schematic diagram illustrating an exemplary system for preprocessing and coding image data, according to some embodiments of the present disclosure.

FIG. 1 is a block diagram illustrating a system 100 for preprocessing and coding image data, according to some disclosed embodiments. The image data may include an image (also called a "picture" or "frame"), multiple images, or a video. An image is a static picture. Multiple images may be related or unrelated, either spatially or temporary. A video is a set of images arranged in a temporal sequence.

As shown in FIG. 1, system 100 includes a source device 120 that provides encoded video data to be decoded at a later time by a destination device 140. Consistent with the disclosed embodiments, each of source device 120 and destination device 140 may include any of a wide range of devices, including a desktop computer, a notebook (e.g., laptop) computer, a server, a tablet computer, a set-top box, a mobile phone, a vehicle, a camera, an image sensor, a robot, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include an image/video preprocessor 122, an image/video encoder 124, and an output interface 126. Destination device 140 may include an input interface 142, an image/video decoder 144, and one or more machine vision applications 146. Image/video preprocessor 122 preprocesses image data, i.e., image (s) or video(s), and generates an input bitstream for image/video encoder 124. Image/video encoder 124 encodes the input bitstream and outputs an encoded bitstream 162 via output interface 126. Encoded bitstream 162 is transmitted through a communication medium 160 and received by input interface 142. Image/video decoder 144 then decodes encoded bitstream 162 to generate decoded data, which can be utilized by machine vision applications 146.

More specifically, source device 120 may further include various devices (not shown) for providing source image data to be preprocessed by image/video preprocessor 122. The devices for providing the source image data may include an image/video capture device, such as a camera, an image/video archive or storage device containing previously captured images/videos, or an image/video feed interface to receive images/videos from an image/video content provider.

Image/video encoder 124 and image/video decoder 144 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the encoding or decoding is implemented partially in software, image/video encoder 124 or image/video decoder 144 may store instructions for the software in a suitable, non-transitory computer-readable medium and execute the instructions in hardware using one or more processors to perform the techniques consistent this disclosure. Each of image/video encoder 124 or image/video decoder 144 may be included in one or more encoders or decoders, either of which may be integrated as part of a combined encoder/decoder (CODEC) in a respective device.

Image/video encoder 124 and image/video decoder 144 may operate according to any video coding standard, such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc. Alternatively, image/video encoder 124 and image/video decoder 144 may be customized devices that do not comply with the existing standards. Although not shown in FIG. 1, in some embodiments, image/video encoder 124 and image/video decoder 144 may each be integrated with an audio encoder and decoder, and may include appropriate MUX-DEMUX units, or other hardware and software, to handle encoding of both audio and video in a common data stream or separate data streams.

Output interface 126 may include any type of medium or device capable of transmitting encoded bitstream 162 from source device 120 to destination device 140. For example, output interface 126 may include a transmitter or a transceiver configured to transmit encoded bitstream 162 from source device 120 directly to destination device 140 in real-time. Encoded bitstream 162 may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded bitstream 162 from source device 120 and provide encoded bitstream 162 to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded image data. In some embodiments, a computing device of a medium production facility, such as a disc stamping facility, may receive encoded image data from source device 120 and produce a disc containing the encoded video data.

Input interface 142 may include any type of medium or device capable of receiving information from communication medium 160. The received information includes encoded bitstream 162. For example, input interface 142 may include a receiver or a transceiver configured to receive encoded bitstream 162 in real-time.

Machine vision applications 146 include various hardware or software for utilizing the decoded image data generated by image/video decoder 144. For example, machine vision applications 146 may include a display device that displays the decoded image data to a user and may include any of a variety of display devices such as a cathode ray tube (CRT), a liquid crystal display (LCD), a plasma display, an organic light emitting diode (OLED) display, or another type of display device. As another example, machine vision applications 146 may include one or more processors configured to use the decoded image data to perform various machine-vision applications, such as object recognition and tracking, face recognition, images matching, image/video search, augmented reality, robot vision and navigation, autonomous driving, 3-dimension structure construction, stereo correspondence, motion tracking, etc.

Next, exemplary image data encoding and decoding techniques are described in connection with FIGS. 2A-2B and FIGS. 3A-3B.

Figure 2A:
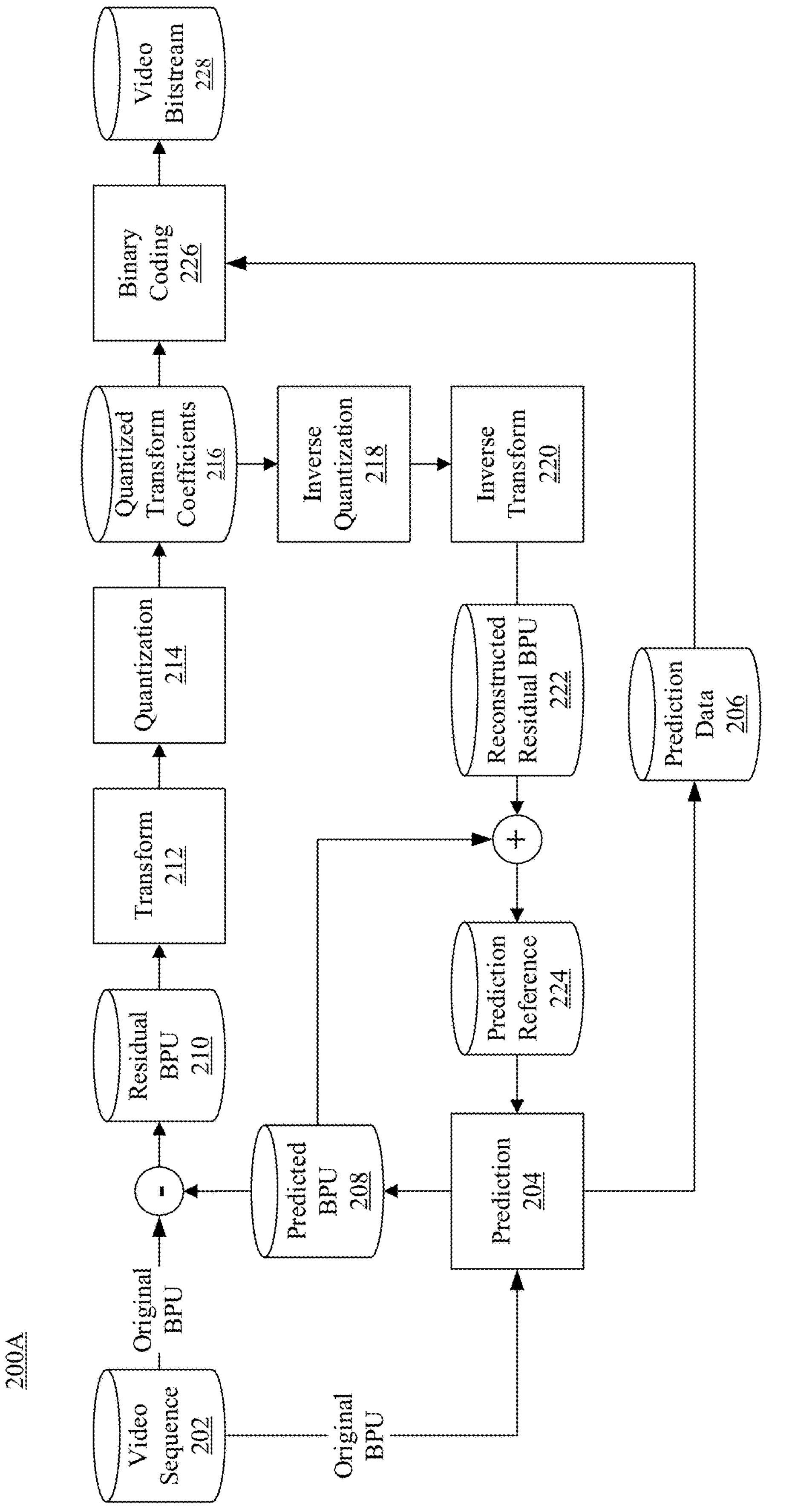
FIG. 2A is a schematic diagram illustrating an exemplary encoding process of a hybrid video coding system, according to some embodiments of the disclosure.

FIG. 2A illustrates a schematic diagram of an example encoding process 200A, consistent with embodiments of the disclosure. For example, the encoding process 200A can be performed by an encoder, such as image/video encoder 124 in FIG. 1. As shown in FIG. 2A, the encoder can encode video sequence 202 into video bitstream 228 according to process 200A. Video sequence 202 can include a set of pictures (referred to as "original pictures") arranged in a temporal order. Each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224 and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can involve multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
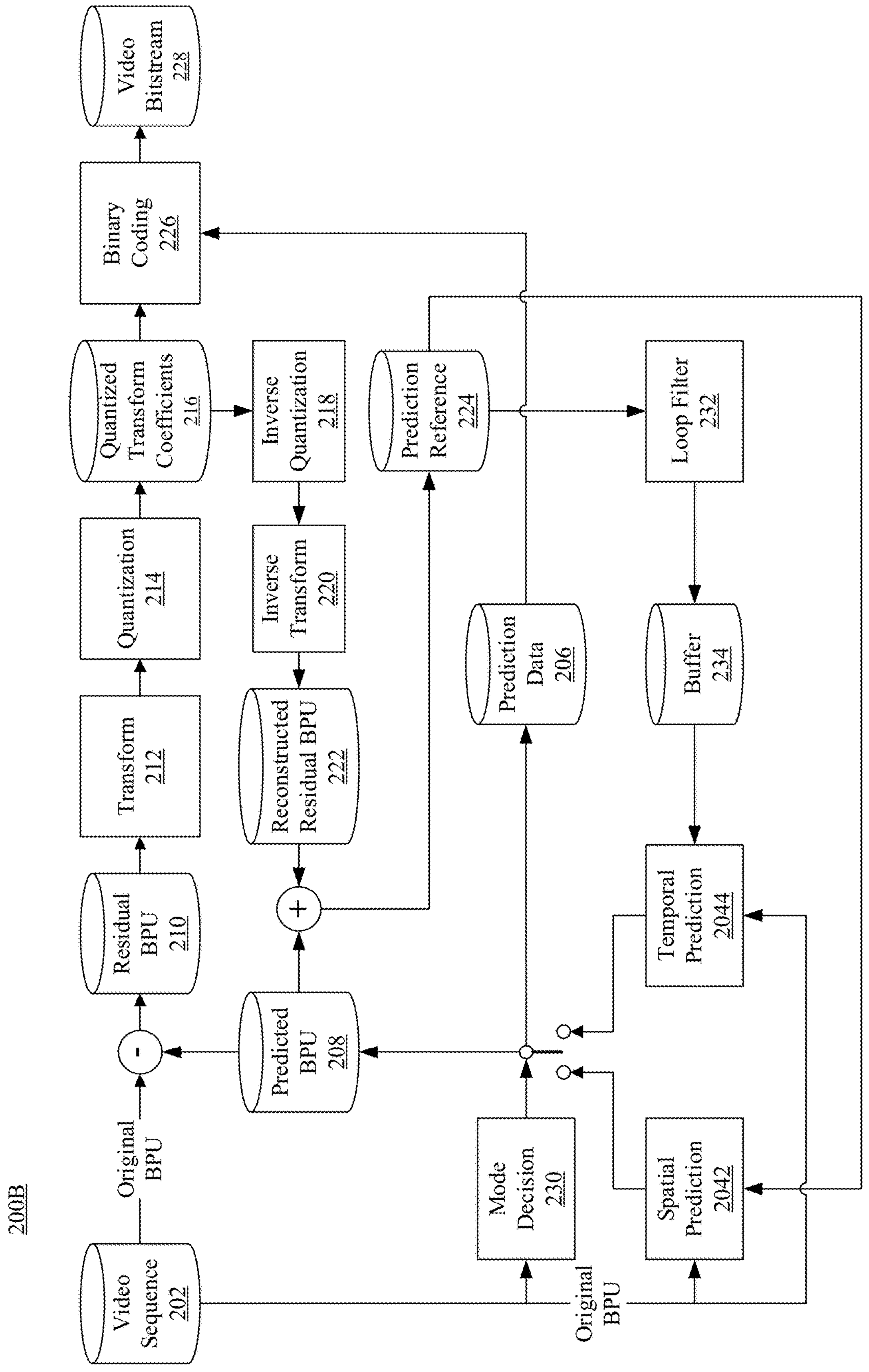
FIG. 2B is a schematic diagram illustrating another exemplary encoding process of a hybrid video coding system, according to some embodiments of the disclosure.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline, it can be deemed that the matching region "moves" to the location of the original BPU as time goes by. The encoder can record the direction and distance of such a motion as a "motion vector." When multiple reference pictures are used, the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used, the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. Unidirectional inter predictions use a reference picture that precedes the current picture. Bidirectional inter predictions can use one or more reference pictures at both temporal directions with respect to the current picture.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
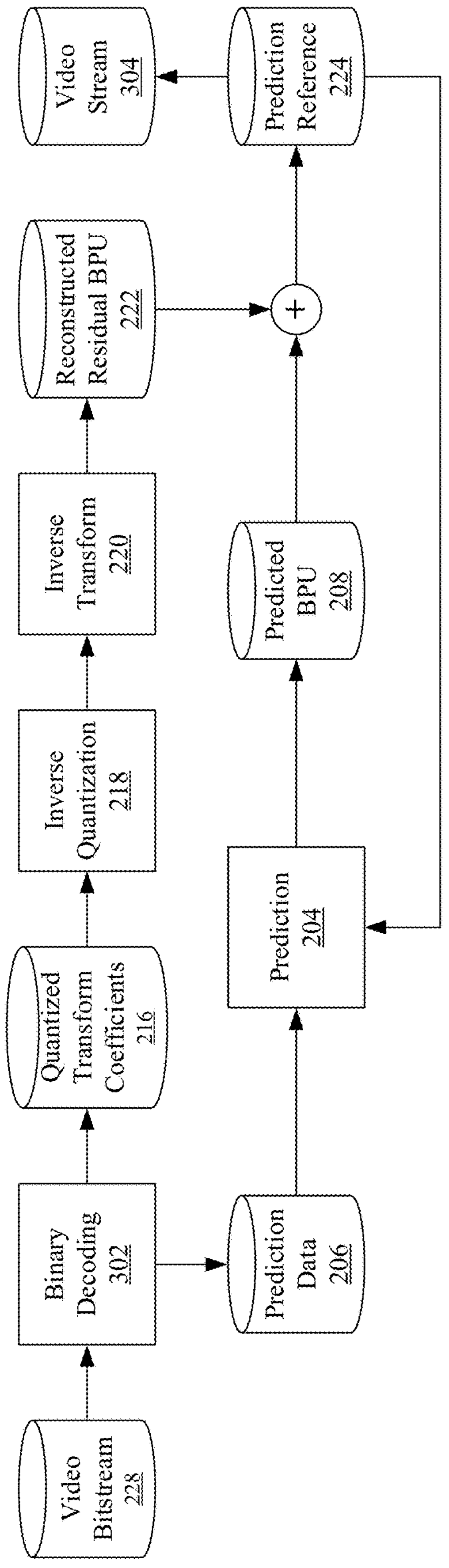
FIG. 3A is a schematic diagram illustrating an exemplary decoding process of a hybrid video coding system, according to some embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder (e.g., image/video decoder 144 in FIG. 1) can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
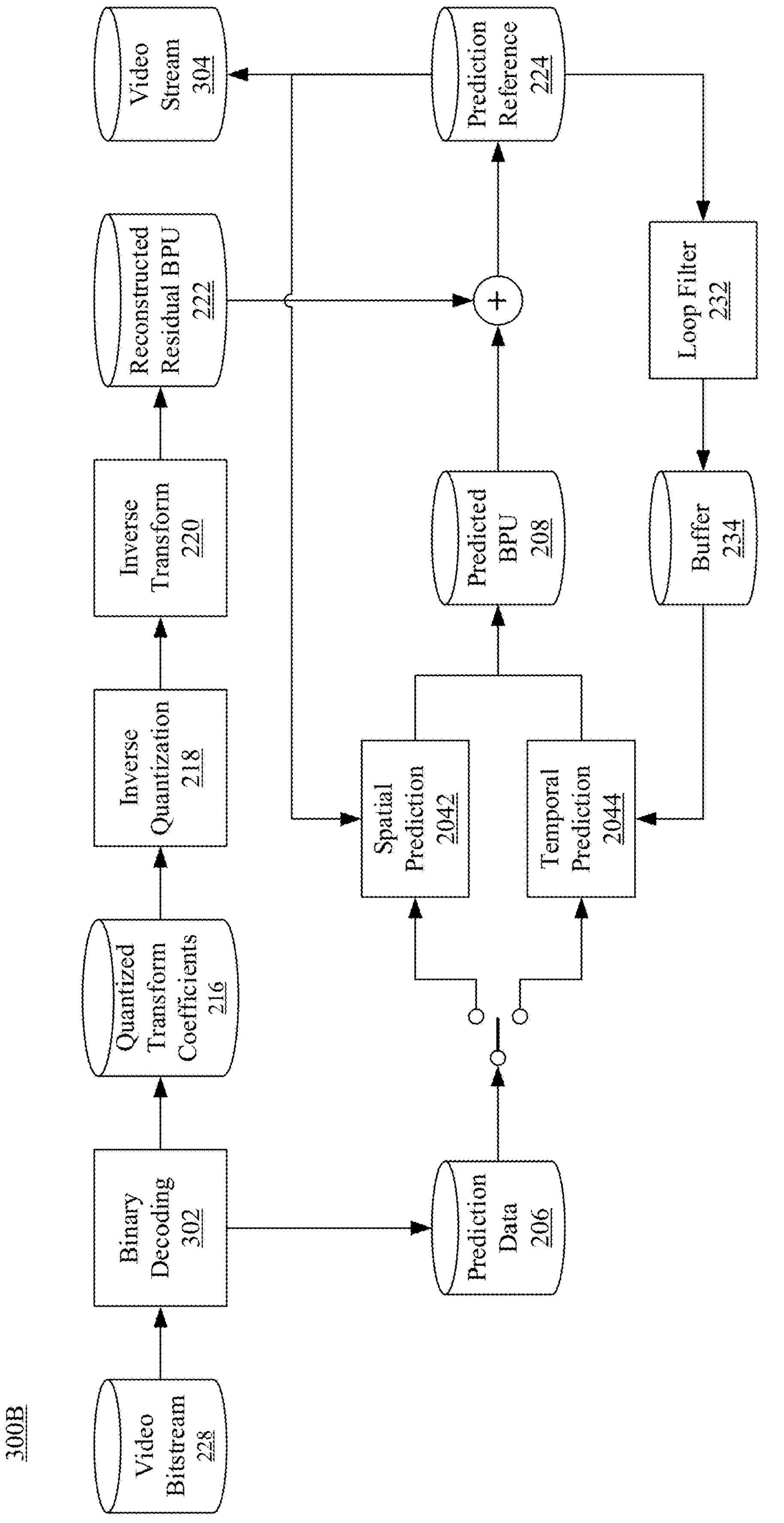
FIG. 3B is a schematic diagram illustrating another exemplary decoding process of a hybrid video coding system, according to some embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
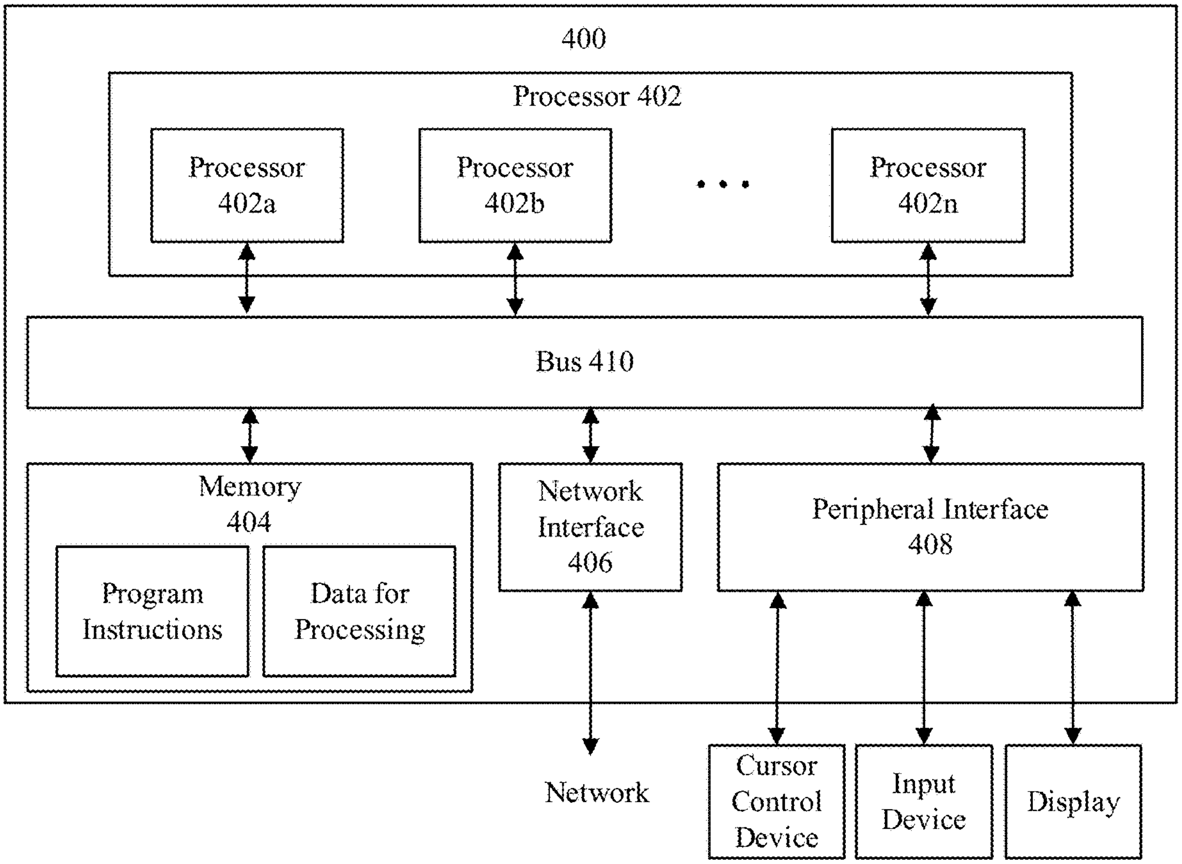
FIG. 4 is a block diagram of an exemplary apparatus for preprocessing or coding image data, according to some embodiments of the present disclosure.

Referring back to FIG. 1, each image/video preprocessor 122, image/video encoder 124, and image/video decoder 144 may be implemented as any suitable hardware, software, or a combination thereof. FIG. 4 is a block diagram of an example apparatus 400 for processing image data, consistent with embodiments of the disclosure. For example, apparatus 400 may be a preprocessor, an encoder, or a decoder. As shown in FIG. 4, apparatus 400 can include processor 402. When processor 402 executes instructions described herein, apparatus 400 can become a specialized machine for preprocessing, encoding, and/or decoding image data. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402*a*, processor 402*b*, and processor 402*n*.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Generally, because of the rich information of video data, video accounts for 65% of all internet traffic. Meanwhile, due to the large data volume of video, video compression is indispensable to facilitate the real-time video transmission in various applications, such as live broadcast and video conference. With the development of computer vision, machine vision is replacing human vision in multiple new application scenarios, such as intelligent traffic and smart city, for the analysing and understanding of video data. Motivated by this, an efficient video compression towards machine vision (VCM) is highly desired.

Spatial resampling is an important solution to improve video compression efficiency, motivated by the high spatial redundancy of video data. For spatial resampling towards human vision, a down-sampling-based framework can be used for image compression performance improvement at low bitrates. In order to preserve the high-frequency information degradation caused by spatial resampling, the local random convolution kernel can be used. Regarding spatial resampling for machine vision, a spatial resampling model can be used and optimized with a joint loss function, which is composed signal-level distortion and machine vision loss function. Moreover, a simulation codec can be used for the joint optimization of spatial down-sampling and up-sampling with codec. However, the spatial complexity of various videos could be diverse, indicating that spatial resampling should be performed adaptively in terms of videos, for robustness and coding efficiency. Currently, the adaptive algorithm of video spatial resampling for machine vision has not been fully investigated.

Figure 5:
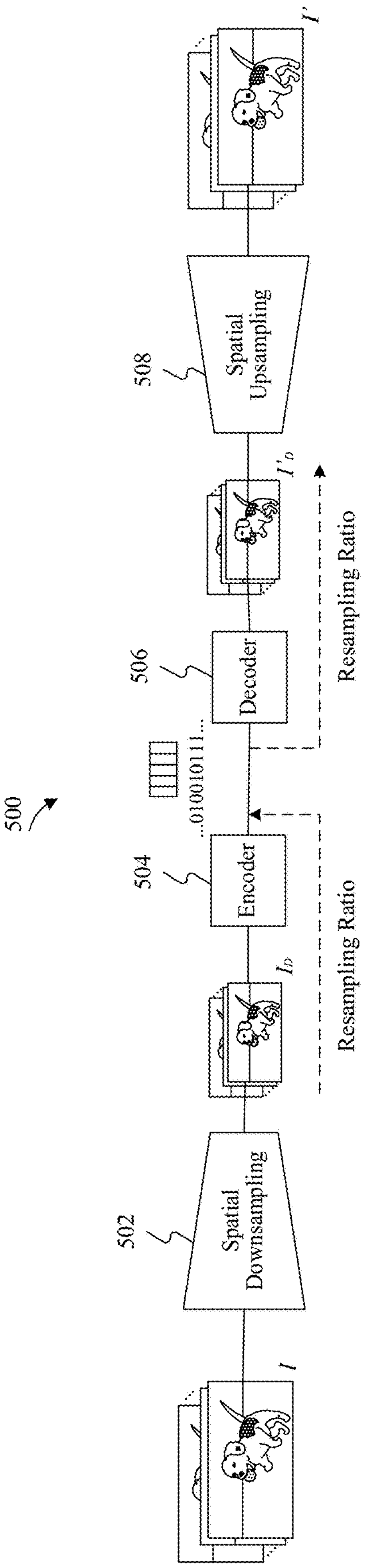
FIG. 5 is a schematic diagram illustrating an exemplary spatial resampling-based compression framework, according to some embodiments of the present disclosure.

There are numerous spatial resampling algorithms proposed towards machine vision to achieve noticeable performance improvements. FIG. 5 is a schematic diagram illustrating an exemplary spatial resampling-based compression framework, according to some embodiments of the present disclosure. The spatial resampling-based compression framework 500 can be used in machine vision oriented spatial resampling algorithms. As shown in FIG. 5, before encoding, the input video data I is rescaled with a spatial down-sampling model 502. The down-sampled data $I_D$ is the output after the spatial down-sampling 502 and then compressed with the encoder 504. After decoding, the decompressed down-sampled data $I'_D$ is obtained after the decoder 506. The reconstructed video data I' is the output after the spatial up-sampling 508, based on the resampling ratio transmitted along with the bitstream. Since the spatial complexity of videos can be different, the same spatial resampling technique for various videos could limit the robustness and performance improvement. Therefore, an adaptive spatial resampling is in needed.

The present disclosure provides methods and apparatuses for adaptive spatial resampling towards machine version. The disclosed methods and apparatuses machine can be used for vision tasks such as object detection, instance segmentation, and object tracking.

Figure 6:
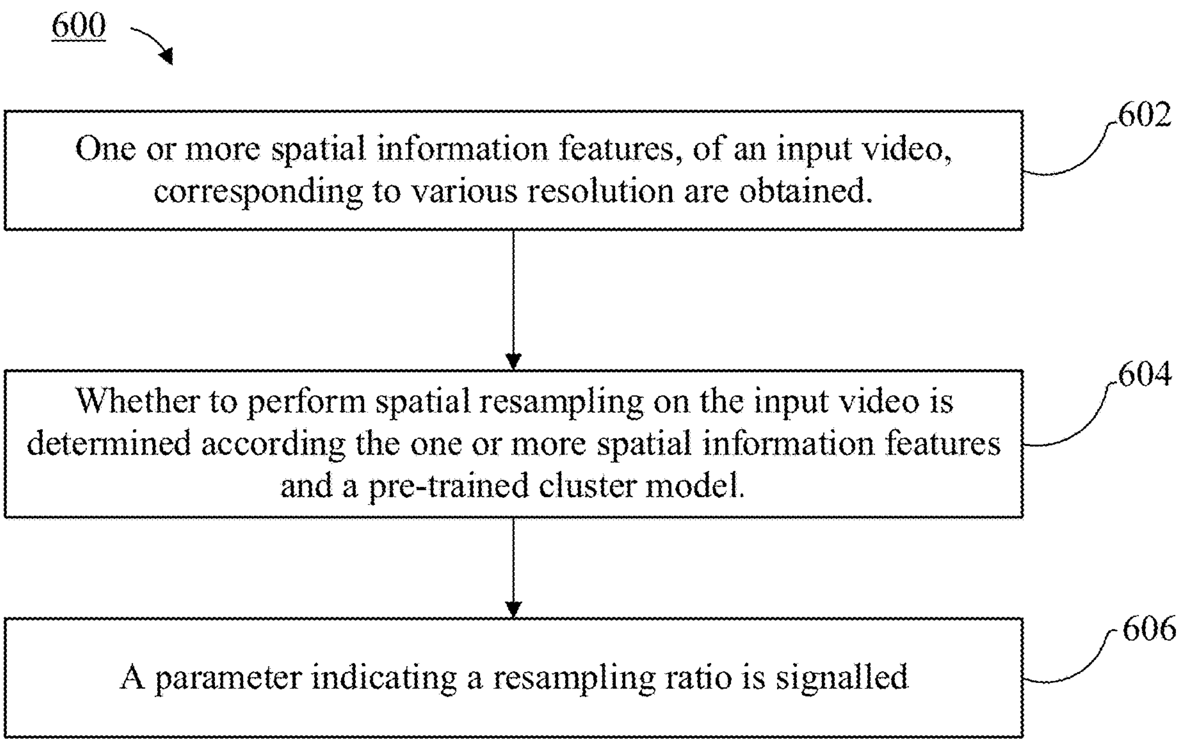
FIG. 6 is a flowchart of an exemplary method for adaptive spatial resampling towards machine version, according to some embodiments of the present disclosure.

FIG. 6 is a flowchart of an exemplary method for adaptive spatial resampling towards machine version, according to some embodiments of the present disclosure. Method 600 can be performed by one or more software or hardware components of an apparatus. In some embodiments, method 600 can be implemented by a computer program product, embodied in a computer-readable medium, including computer-executable instructions, such as program code, executed by apparatus 400 shown in FIG. 4. Method 600 may include the following steps 602 and 604.

At step 602, one or more spatial information features, of an input video, corresponding to various resolution are obtained.

The spatial complexity can be different for various videos, and spatial information (SI) is adopted to measure the spatial complexity using SI/TI-Tools. The SI/TI-tools is used for calculating spatial information (SI) and temporal information (TI). Spatial information of the input video under various resolutions can be obtained. Given an input video $\{I_0, I_1, \ldots, I_n\}$, n is the frame number, the spatial information of the input video is $\{si(I_0), si(I_1), \ldots, si(I_n)\}$, where $si(\cdot)$ is the spatial information calculation function. The overall spatial information of the input video si can be defined as $$\sum_{j=0}^{m-1} si(I_j)/m,$$

for example m=1.

In order to achieve the spatial complexity of the input video under various resolutions, given a set of pre-defined resolutions, such as {416×240, 832×480, 1280×720, 1920×1080, 2560×1600}, denoted as $D=\{d_l\}$, where $d_l=(w_l, h_l)$, $l=0, \ldots, k$ and $(w_l, h_l)$ indicates the width and height, respectively. As such, the spatial information of the input video under various resolutions D can be defined as $si_D=\{si_{d_0}, \ldots, si_{d_k}\}$, which is achieved by resizing the input video to resolution $d_l$ with bicubic interpolation. In some embodiments, the set of pre-defined resolutions D can include other resolutions.

In some embodiments, an amplitude of spatial information and a slope of the spatial information are calculated and obtained. Based on the spatial information under various resolutions $si_D$, the amplitude of spatial information caused by spatial resampling, indicating the spatial complexity in terms of the amplitude variation under spatial resampling processing, is formulated as $$\left\{\frac{|si_{d_0} - si_{d_1}|}{si_{d_0}}, \frac{|si_{d_0} - si_{d_2}|}{si_{d_0}}, \ldots, \frac{|si_{d_0} - si_{d_k}|}{si_{d_0}}\right\},$$

denoted as $\{a_1, a_2, \ldots, a_k\}$.

The slope of the spatial information, indicating the spatial complexity in terms of the changing speed under spatial resampling processing, is further formulated as $$\left\{\frac{|a_2 - a_1|}{(w_2 * h_2 - w_1 * h_1)/(w_0 * h_0)}, \frac{|a_3 - a_2|}{(w_3 * h_3 - w_2 * h_2)/(w_0 * h_0)}, \ldots, \frac{|a_k - a_{k-1}|}{(w_k * h_k - w_{k-1} * h_{k-1})/(w_1 * h_1)}\right\},$$

denoted as $\{s_1, s_2, \ldots, s_{k-1}\}$.

Based on the amplitude and the slope, the spatial information of the input video has been calculated and processed into two kinds of features, which are $\{a_1, a_2, \ldots, a_k\}$ and $\{s_1, s_2, \ldots, s_{k-1}\}$, describing the amplitude and the slope of the spatial information in terms of spatial resampling, respectively.

In some embodiments, more kinds of features can also be calculated to describe the spatial information.

At step 604, whether to perform spatial resampling on the input video is determined according to the one or more spatial information features and a pre-trained cluster model.

Figure 7:
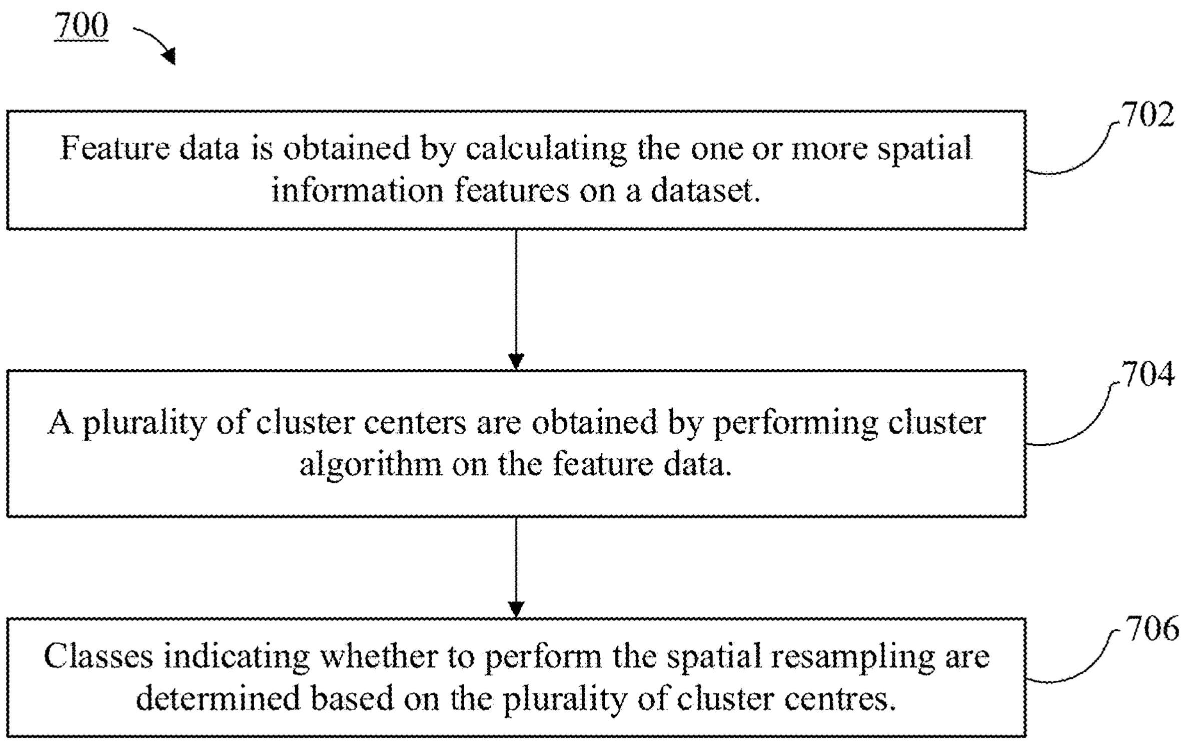
FIG. 7 is a flowchart of an exemplary method for constructing a pre-trained cluster model, according to some embodiments of the present disclosure.

FIG. 7 is a flowchart of an exemplary method for constructing a pre-trained cluster model, according to some embodiments of the present disclosure. Method 700 can be performed by one or more software or hardware components of an apparatus. In some embodiments, method 700 can be performed by one or more processors (e.g., processor 402 in FIG. 4). For example, the processor may include any combination of any number of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), a neural processing unit (NPU), and any type of circuit capable of data processing. In some embodiments, the accelerator can include the GPU, the NPU, among other types. In some embodiments, method 700 can be implemented by a computer program product, embodied in a computer-readable medium, including computer-executable instructions, such as program code, executed by computers. Method 700 may include the following steps 702 to 708.

At step 702, feature data is obtained by calculating the one or more spatial information features, e.g., amplitude and slope, on a dataset. In some embodiments, the dataset may be a large video dataset, for example, BVI-DVC dataset used for deep video compression. BVI-DVC dataset is used for training CNN-based video compression systems, with specific emphasis on machine learning tools that enhance conventional coding architectures, including spatial resolution and bit depth up-sampling, post-processing and in-loop filtering. In some embodiments, dataset of TVD or SFU-HW could be used. A feature data S can be obtained by calculating the spatial information features on the BVI-DVC dataset, formulated as $S=\{(a_1, a_2, \ldots, a_k, s_1, s_2, \ldots, s_{k-1})_t\}$, $t=1, 2, 3, \ldots, N$, and N is the sequence number of the dataset.

Figure 8:
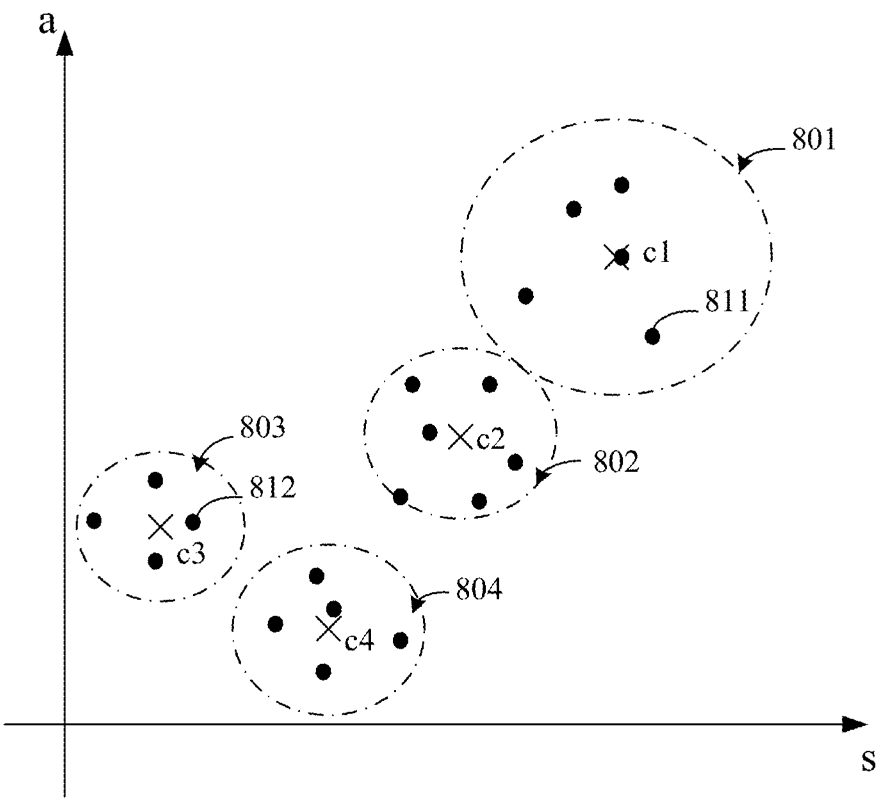
FIG. 8 illustrates a diagram showing exemplary cluster result with four cluster centres, according to some embodiments of the present disclosure.

At step 704, a plurality of cluster centers are obtained by performing cluster algorithm on the feature data. For example, a K-Means cluster is performed with class number 4 on S. In some embodiments, more classes can be applied, for example, 6 classes or 9 classes. FIG. 8 illustrates a diagram showing exemplary cluster result with four cluster centres, according to some embodiments of the present disclosure. As shown in FIG. 8, based on the cluster results, the 4 cluster centres $\{c_1, c_2, c_3, c_4\}$ are calculated based on a feature distance in term of spatial information features, amplitude a and slope s. A feature distance of a cluster center can be obtained by calculating means square error (MSE) of an amplitude and a slope of the cluster centre.

At step 706, classes indicating whether to perform the spatial resampling are determined based on the plurality of cluster centres. For example, the plurality of cluster centres can be further divided into two groups. Input videos in the classes corresponding to the cluster centres in a first group can be determined to perform spatial resampling, and input videos in the classes corresponding to the cluster centres in a second group can be determined not to perform spatial resampling. Referring to FIG. 8, in this example, the two cluster centres, denoted $\{c_3, c_4\}$ with smaller amplitude and slope, which are defined by $\max(avg(a(c_3)), avg(a(c_4))) < \min(avg(a(c_1)), avg(a(c_2)))$ and $\max(avg(s(c_3)), avg(s(c_4))) < \min(avg(s(c_1)), avg(s(c_2)))$, are determined to be included in the first group, and the input videos in the corresponding classes (e.g., classes 803, 804) are determined to perform spatial resampling, since the influence of spatial resampling is small on these videos. Herein, $avg(\cdot)$ indicates the average calculation, $a(c_i)$ and $s(c_i)$ are the features of cluster $c_i$, i=1, 2, 3,4. The remaining two cluster centres $\{c_1, c_2\}$ are determined to be included in the second group, and the input videos in the corresponding classes (e.g., classes 801, 802) are determined to be compressed without spatial resampling.

Based on the pre-trained cluster model obtained above, for any new input video and the spatial information features, whether to perform spatial resampling on the input video can be determined. In some embodiments, based on the one or more spatial information features and the pre-trained cluster model, whether to perform spatial resampling on the input video is determined according to the class that the input video is classified to, or the distance between the input video and the cluster centers.

Figure 9:
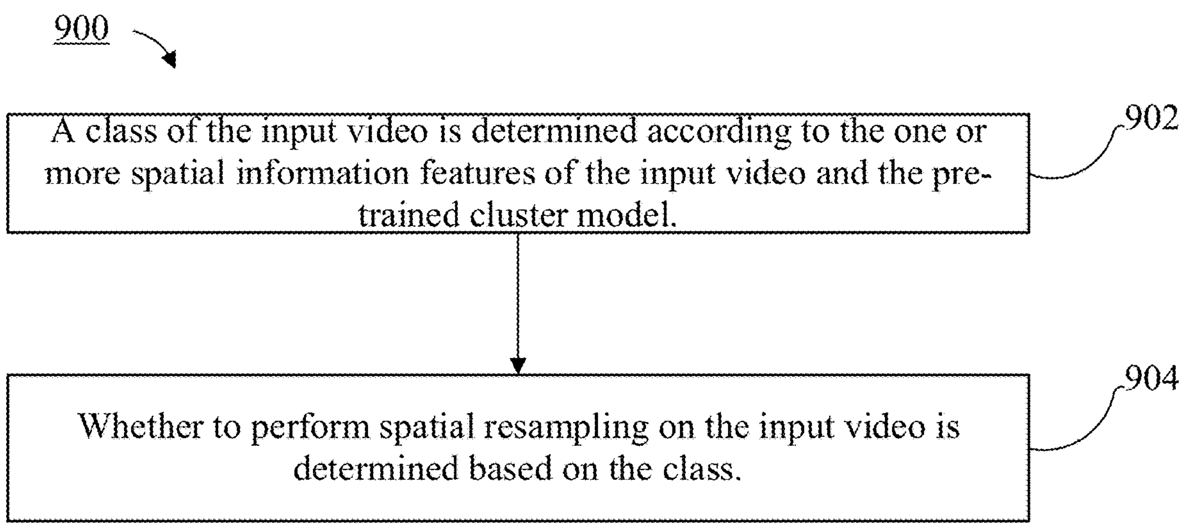
FIG. 9 is a flowchart of another exemplary method for adaptive spatial resampling towards machine version, according to some embodiments of the present disclosure.

FIG. 9 is a flowchart of another exemplary method for adaptive spatial resampling towards machine version, according to some embodiments of the present disclosure. Method 900 can be performed by one or more software or hardware components of an apparatus. In some embodiments, method 900 can be implemented by a computer program product, embodied in a computer-readable medium, including computer-executable instructions, such as program code, executed by apparatus 400 shown in FIG. 4. As shown in FIG. 9, step 604 shown in FIG. 6 may further include the following steps 902 to 906.

At step 902, a class of the input video is determined according to the one or more spatial information features of the input video and the pre-trained cluster model. For example, referring to FIG. 8, an input video 811 is determined to be included in class 801, and an input video 812 is determined to be included in class 803.

At step 904, whether to perform spatial resampling on the input video is determined based on the class. Referring to FIG. 8, since input video 811 is included in class 801, i.e., the class of input video 811 is 801, input video 811 is further determined not to perform spatial resampling. Since input video 812 is included in class 803, i.e., the class of input video 812 is 803, input video 812 is further determined to perform spatial resampling. Therefore, with the classification for input videos, whether to perform spatial resampling can be determined and a corresponding resampling ratio can be determined. With the classification according to the pre-trained model, determining whether to perform resampling on an input video can allow the encoding side to be more efficient.

In some embodiments, in order to improve the robustness of the adaptive spatial resampling algorithm, videos around the cluster boundary of various classes are not selected for spatial resampling.

Figure 10:
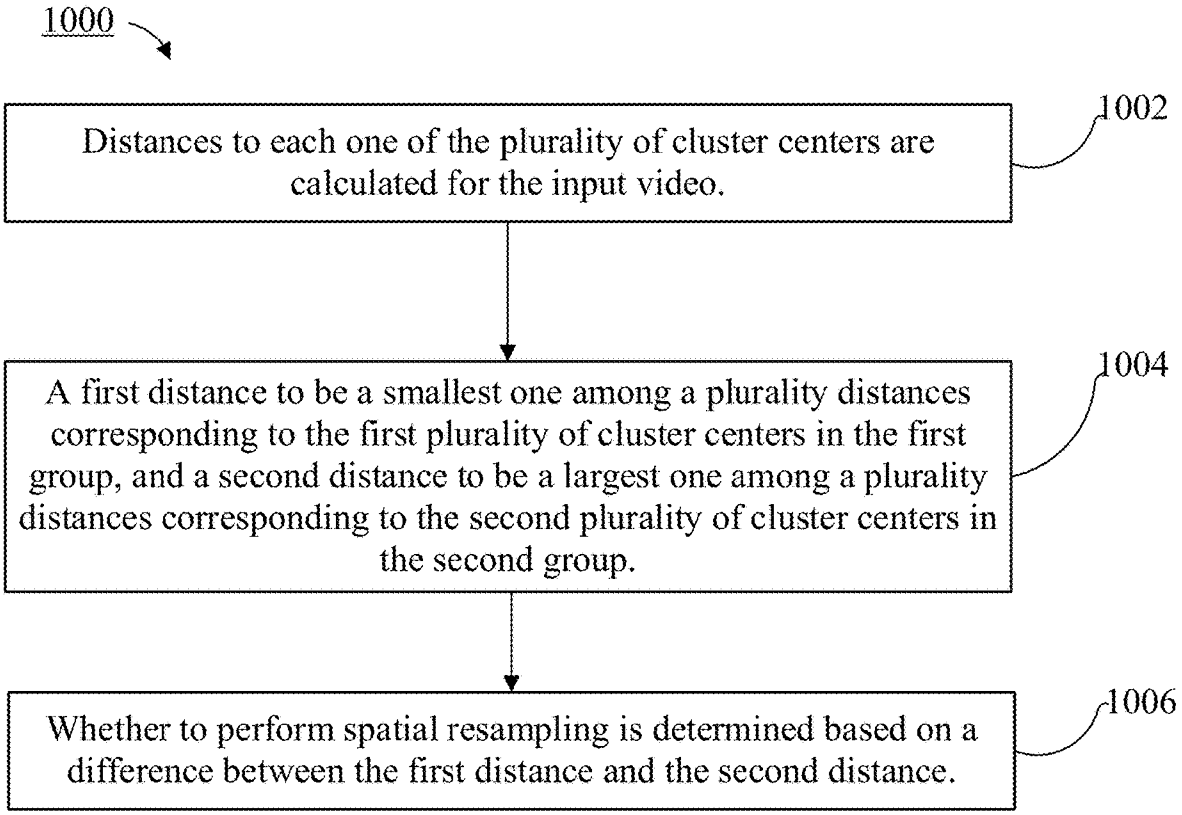
FIG. 10 is a flowchart of another exemplary method for adaptive spatial resampling towards machine version, according to some embodiments of the present disclosure.

FIG. 10 is a flowchart of another exemplary method for adaptive spatial resampling towards machine version, according to some embodiments of the present disclosure. Method 1000 can be performed by one or more software or hardware components of an apparatus. In some embodiments, method 1000 can be implemented by a computer program product, embodied in a computer-readable medium, including computer-executable instructions, such as program code, executed by apparatus 400 shown in FIG. 4. As shown in FIG. 10, step 604 shown in FIG. 6 may further include the following steps 1002 to 1006.

At step 1002, distances to each one of the plurality of cluster centers are calculated for the input video. The plurality cluster centres are obtained based on the pre-trained cluster model. For example, the pre-trained cluster model can be obtained according to the method 700 shown in FIG. 7. According to method 700, 4 cluster centres $\{c_1, c_2, c_3, c_4\}$ can be obtained. The two cluster centres $\{c_3, c_4\}$ in the first group with smaller amplitude and slope correspond to the classes in which the input video is performed with spatial resampling. The two cluster centres $\{c_1, c_2\}$ in the second group correspond to the classes in which the input video should be compressed without spatial resampling. The distances to each of the 4 cluster centres $\{c_1, c_2, c_3, c_4\}$, in terms of spatial information features, can be calculated respectively. For example, an input video's feature centre distances can be denoted as $\{d_1, d_2, d_3, d_4\}$. The distance between the input video and a cluster center is a mean square error (MSE) of a feature vector of the input video and a feature vector of the cluster center.

Referring back to FIG. 10, at step 1004, a first distance to be a smallest one among a plurality of distances corresponding to the first plurality of cluster centers in the first group, and a second distance to be a largest one among a plurality distances corresponding to the second plurality of cluster centers in the second group. In another word, distances of small and large spatial complexities for the input video are obtained. In some embodiments, a small spatial complexity, i.e., the first distance, denoted as $d_{small}=\max(\{d_3, d_4\})$ is obtained, and a large spatial complexity, i.e., the second distance, denoted as $d_{large}=\max(\{d_1, d_2\})$ is obtained.

At step 1006, whether to perform spatial resampling is determined based on a difference between the first distance and the second distance. For example, if $|d_{small}-d_{large}|\leq\varepsilon$, that means, the input video is around the cluster boundary of classes, spatial resampling is not performed on the input video, where ε is a pre-defined threshold, for example, ε is equal to 0.1. If $|d_{small}-d_{large}|>\varepsilon$, spatial resampling is performed on the input video.

Referring back to FIG. 6, in some embodiments, method 600 further includes step 606. At step 606, a parameter indicating a resampling ratio is signalled in a bitstream. For example, if it is determined not to perform spatial resampling on the input video at step 604, the parameter indicting a resampling ratio of 1 is signalled to a decoder. In some embodiments, the parameter can be signalled as an index with different values to indicate different resampling ratios. In some embodiments, the resampling ratio can be predefined when it is determined to perform spatial resampling on the input video.

Figure 11:
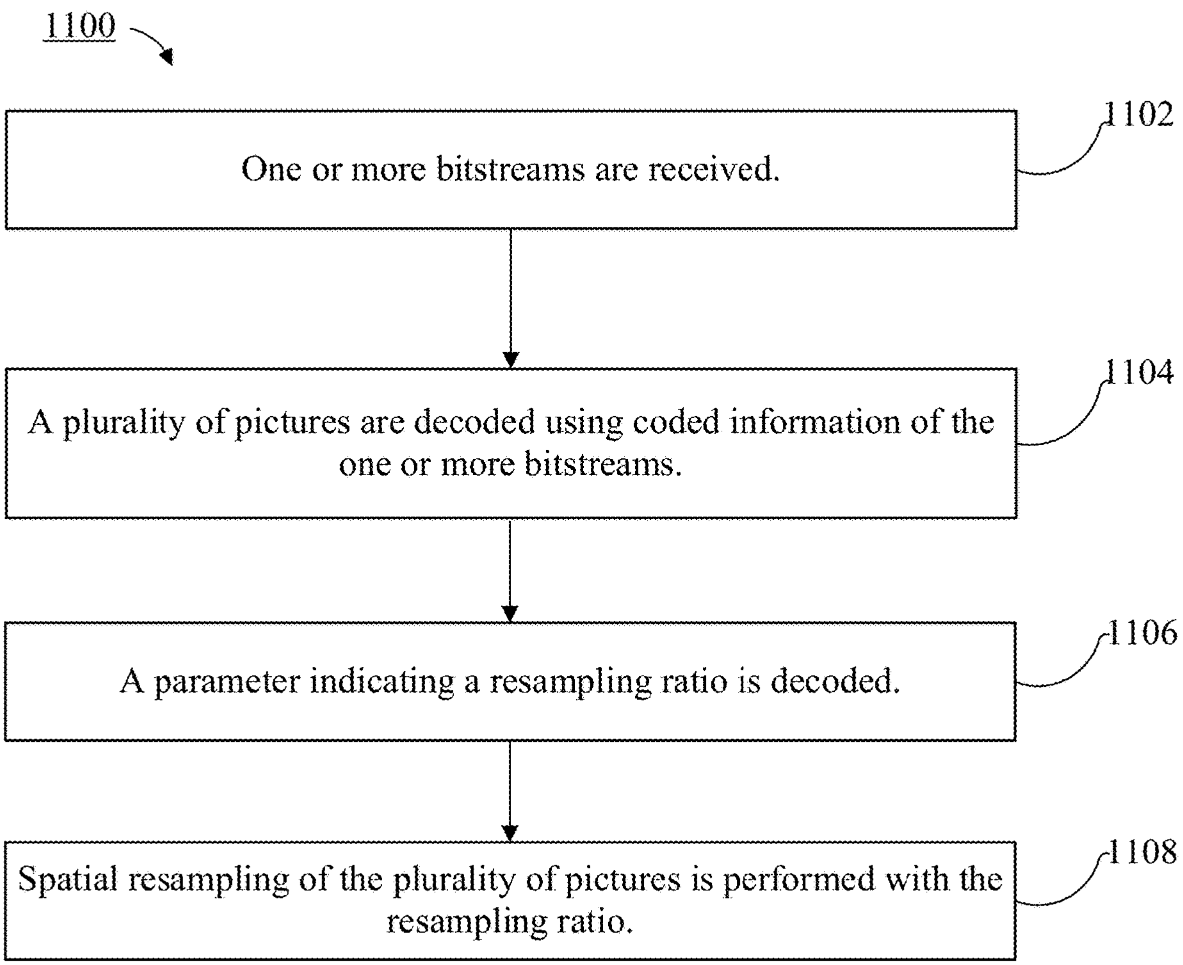
FIG. 11 is a flowchart of an exemplary method for decoding a resampled video, according to some embodiments of the present disclosure.

FIG. 11 is a flowchart of an exemplary method for decoding a resampled video, according to some embodiments of the present disclosure. Method 1100 can be performed by a decoder (e.g., by process 300A of FIG. 3A or 300B of FIG. 3B) or performed by one or more software or hardware components of an apparatus. In some embodiments, method 1100 can be implemented by a computer program product, embodied in a computer-readable medium, including computer-executable instructions, such as program code, executed by apparatus 400 shown in FIG. 4. As shown in FIG. 11, method 1100 includes steps 1102 to 1108.

At step 1102, one or more bitstreams are received. The bitstream includes coded information for the videos/pictures.

At step 1104, a plurality of pictures are decoded using coded information of the one or more bitstreams.

At step 1106, a parameter indicating a resampling ratio is decoded. In some embodiments, the parameter is decoded as an index with different values to indicate different resampling ratios. In some embodiments, the parameter indicating a resampling ratio of 1 is decoded for the resampling being not performed.

At step 1108, spatial resampling of the plurality of pictures is performed with the resampling ratio. The resampling ratio is determined according to one or more spatial information features of a video sequence and a pre-trained cluster model as described above with FIG. 7 and FIG. 8.

In some embodiments, adaptivity in terms of bitrate can also be considered, and whether to perform spatial resampling is further determined based on the bitrate of the compression. Specifically, except for the cluster result of the input video in terms of spatial information, the bitrate of the compression is also important. Generally, for high bitrate, the spatial resampling tends to introduce obvious fidelity degradation, compared with no spatial resampling. For lower bitrates, since the fidelity has already been degraded by compression, spatial resampling tends to achieve performance improvement by saving coding bits. If the bitrate is greater than a threshold value, the spatial resampling is determined not to be performed. If the bitrate is smaller than the threshold value, the spatial resampling is determined to be performed. The threshold value can be varied according to different resolutions.

In some embodiments, a quantization parameter (QP) is important for the compression bitrate, and whether to perform spatial resampling is determined based on the QP. The larger QP is, the smaller bitrate is. If the QP is smaller than a threshold value, the spatial resampling is determined not to be performed. If the QP is greater than the threshold value, the spatial resampling is determined to be performed. The threshold value can be varied according to different resolutions. For example, if QP for the compression codec (e.g., encoder 124 shown in FIG. 1) is smaller than a threshold $QP_t$, for example 32, spatial resampling is determined not to be performed.

It is appreciated that embodiments of the present disclosure can be combined with another embodiments or some other embodiments.

In some embodiments, a non-transitory computer-readable storage medium storing one or more bitstreams processed according to the above-described methods is also provided. For example, the one or more bitstreams may be encoded and decoded using the above-described adaptive spatial resampling algorithms.

In some embodiments, a non-transitory computer-readable storage medium including instructions is also provided, and the instructions may be executed by one or more processors of a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

The embodiments may further be described using the following clauses:

1. A method of encoding a video sequence into a bitstream, the method comprising:
  - receiving a video sequence comprising a plurality of pictures;
  - determining one or more spatial information features of the video sequence corresponding to various resolution;
  - performing spatial resampling on the video sequence according to the one or more spatial information features and a pre-trained cluster model; and
  - encoding the spatial resampled video sequence into the bitstream.

2. The method according to clause 1, wherein the one or more spatial information features comprise an amplitude and a slope, and determining the one or more spatial information features of the video sequence corresponding to various resolution further comprises:
  - obtaining spatial information of the video sequence; and
  - calculating the amplitude and the slope of the video sequence corresponding to various resolution.

3. The method according to clause 2, wherein the pre-trained cluster model is constructed by:
  - obtaining feature data by calculating the one or more spatial information features on a dataset;
  - obtaining a plurality of cluster centers by performing cluster algorithm on the feature data; and
  - determining, based on the plurality of cluster centers, classes indicating whether to perform the spatial resampling.

4. The method according to clause 3, wherein the cluster algorithm is K-Means cluster.

5. The method according to clause 3, wherein determining, based on the plurality of cluster centers, the classes indicating whether to perform the spatial resampling, further comprises:
  - dividing the plurality of cluster centers into a first group and a second group based on a feature distance of each one of the plurality of cluster centers, wherein an average feature distance of a first plurality of cluster centers in the first group is smaller than an average feature distance of a first plurality of cluster centers in the second group;
  - determining a first plurality of classes corresponding to the first plurality of cluster not to perform the spatial resampling; and
  - determining a second plurality of classes corresponding to the second plurality of cluster to perform the spatial resampling.

6. The method according to clause 5, wherein performing the spatial resampling on the video sequence according to the one or more spatial information features and the pre-trained cluster model further comprises:
  - determining a class of the video sequence according to the one or more spatial information features of the video sequence and the pre-trained cluster model; and
  - determining whether to perform spatial resampling on the video sequence according to the class.

7. The method according to clause 3, wherein performing the spatial resampling on the video sequence according to the one or more spatial information features and the pre-trained cluster model further comprises:
  - dividing the plurality of cluster centers into a first group and a second group based on a feature distance of each one of the plurality of cluster centers, wherein an average feature distance of a first plurality of cluster centers in the first group is smaller than an average feature distance of a first plurality of cluster centers in the second group;
  - calculating distances to each one of the plurality of cluster centers for the video sequence;
  - obtaining a first distance to be a smallest one among a plurality distances corresponding to the first plurality of cluster centers in the first group, and a second distance to be a largest one among a plurality distances corresponding to the second plurality of cluster centers in the second group; and
  - determining whether to perform the spatial resampling based on a difference between the first distance and the second distance.

8. The method according to clause 1, wherein before determining one or more spatial information features of the video sequence corresponding to various resolution, the method further comprises:

determining whether to perform the spatial resampling based on a bitrate of the video sequence; and in response to the bitrate being smaller than a threshold value, performing the spatial resampling.

9. The method according to clause 1, wherein before determining one or more spatial information features of the video sequence corresponding to various resolution, the method further comprises:

determining whether to perform the spatial resampling based on a quantization parameter (QP) of an encoder; and in response to the QP being greater than or equal to a threshold value, performing the spatial resampling.

10. The method according to clause 1, further comprising:

signaling a parameter indicating a resampling ratio.

11. A method of decoding a bitstream to output one or more pictures for a video stream, the method comprising:

receiving one or more bitstreams;

decoding, using coded information of the one or more bitstreams, a plurality of pictures;

decoding a parameter indicating a resampling ratio; and performing spatial resampling of the plurality of pictures with the resampling ratio;

wherein the resampling ratio is determined according to one or more spatial information features of a video sequence and a pre-trained cluster model.

12. A non-transitory computer readable storage medium storing a bitstream of a video for processing according to operations comprising:

determining one or more spatial information feature of a video sequence corresponding to various resolution;

performing spatial resampling on the video sequence according to the one or more spatial information features and a pre-trained cluster model; and encoding the spatial resampled video sequence into the bitstream.

13. The non-transitory computer readable storage according to clause 12, wherein the operations further comprise:

encoding a parameter indicating a resampling ratio into the bitstream.

14. The non-transitory computer readable storage medium according to clause 12, wherein the operations further comprise:

determining whether to perform the spatial resampling based on a bitrate of the video sequence; and in response to the bitrate is smaller than a threshold value, performing the spatial resampling.

15. The non-transitory computer readable storage medium according to clause 12, wherein the operations further comprise:

determining whether to perform the spatial resampling based on a quantization parameter (QP) of an encoder; and in response to the QP is greater than or equal to a threshold value, performing the spatial resampling.

16. The non-transitory computer readable storage medium according to clause 12, wherein the one or more spatial information feature of the video sequence comprises an amplitude and a slope.

17. The non-transitory computer readable storage medium according to clause 16, wherein the pre-trained cluster model is constructed by:

obtaining feature data by calculating the one or more spatial information features on a dataset;

obtaining a plurality of cluster centers by performing cluster algorithm on the feature data; and determining, based on the plurality of cluster centers, classes indicating whether to perform the spatial resampling.

18. The non-transitory computer readable storage medium according to clause 17, wherein determining, based on the plurality of cluster centers, the classes indicating whether to perform the spatial resampling, further comprises:

dividing the plurality of cluster centers into a first group and a second group based on a feature distance of each one of the plurality of cluster centers, wherein an average feature distance of a first plurality of cluster centers in the first group is smaller than an average feature distance of a first plurality of cluster centers in the second group;

determining a first plurality of classes corresponding to the first plurality of cluster not to perform the spatial resampling; and determining a second plurality of classes corresponding to the second plurality of cluster to perform the spatial resampling.

19. The non-transitory computer readable storage medium according to clause 18, wherein performing the spatial resampling on the video sequence according to the one or more spatial information features and the pre-trained cluster model further comprises:

determining a class of the video sequence according to the one or more spatial information features of the video sequence and the pre-trained cluster model; and determining whether to perform spatial resampling on the video sequence according to the class.

20. The non-transitory computer readable storage medium according to clause 17, wherein performing the spatial resampling on the video sequence according to the one or more spatial information features and the pre-trained cluster model further comprises:

dividing the plurality of cluster centers into a first group and a second group based on a feature distance of each one of the plurality of cluster centers, wherein an average feature distance of a first plurality of cluster centers in the first group is smaller than an average feature distance of a first plurality of cluster centers in the second group;

calculating distances to each one of the plurality of cluster centers for the video sequence;

obtaining a first distance to be a smallest one among a plurality distances corresponding to the first plurality of cluster centers in the first group, and a second distance to be a largest one among a plurality distances corresponding to the second plurality of cluster centers in the second group; and determining whether to perform the spatial resampling based on a difference between the first distance and the second distance.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method of encoding a video sequence into a bitstream, the method comprising:
- receiving a video sequence comprising a plurality of pictures;
- determining one or more spatial information features of the video sequence corresponding to various resolution, wherein the one or more spatial information features comprise an amplitude and a slope;
- performing spatial resampling on the video sequence according to the one or more spatial information features and a pre-trained cluster model; and
- encoding the spatial resampled video sequence into the bitstream.

2. The method according to claim 1, wherein determining the one or more spatial information features of the video sequence corresponding to various resolution further comprises:
- obtaining spatial information of the video sequence; and
- calculating the amplitude and the slope of the video sequence corresponding to various resolution.

3. The method according to claim 2, wherein the pre-trained cluster model is constructed by:
- obtaining feature data by calculating the one or more spatial information features on a dataset;
- obtaining a plurality of cluster centers by performing cluster algorithm on the feature data; and
- determining, based on the plurality of cluster centers, classes indicating whether to perform the spatial resampling.

4. The method according to claim 3, wherein the cluster algorithm is K-Means cluster.

5. The method according to claim 3, wherein determining, based on the plurality of cluster centers, the classes indicating whether to perform the spatial resampling, further comprises:
- dividing the plurality of cluster centers into a first group and a second group based on a feature distance of each one of the plurality of cluster centers, wherein an average feature distance of a first plurality of cluster centers in the first group is smaller than an average feature distance of a first plurality of cluster centers in the second group;
- determining a first plurality of classes corresponding to the first plurality of cluster not to perform the spatial resampling; and
- determining a second plurality of classes corresponding to the second plurality of cluster to perform the spatial resampling.

6. The method according to claim 5, wherein performing the spatial resampling on the video sequence according to the one or more spatial information features and the pre-trained cluster model further comprises:
- determining a class of the video sequence according to the one or more spatial information features of the video sequence and the pre-trained cluster model; and
- determining whether to perform spatial resampling on the video sequence according to the class.

7. The method according to claim 3, wherein performing the spatial resampling on the video sequence according to the one or more spatial information features and the pre-trained cluster model further comprises:
- dividing the plurality of cluster centers into a first group and a second group based on a feature distance of each one of the plurality of cluster centers, wherein an average feature distance of a first plurality of cluster centers in the first group is smaller than an average feature distance of a first plurality of cluster centers in the second group;
- calculating distances to each one of the plurality of cluster centers for the video sequence;
- obtaining a first distance to be a smallest one among a plurality distances corresponding to the first plurality of cluster centers in the first group, and a second distance to be a largest one among a plurality distances corresponding to the second plurality of cluster centers in the second group; and
- determining whether to perform the spatial resampling based on a difference between the first distance and the second distance.

8. The method according to claim 1, wherein before determining one or more spatial information features of the video sequence corresponding to various resolution, the method further comprises:
- determining whether to perform the spatial resampling based on a bitrate of the video sequence; and in response to the bitrate being smaller than a threshold value, performing the spatial resampling.

9. The method according to claim 1, wherein before determining one or more spatial information features of the video sequence corresponding to various resolution, the method further comprises:

determining whether to perform the spatial resampling based on a quantization parameter (QP) of an encoder; and in response to the QP being greater than or equal to a threshold value, performing the spatial resampling.

10. The method according to claim 1, further comprising: signaling a parameter indicating a resampling ratio.

11. A method of decoding a bitstream to output one or more pictures for a video stream, the method comprising:

receiving one or more bitstreams;

decoding, using coded information of the one or more bitstreams, a plurality of pictures;

decoding a parameter indicating a resampling ratio; and performing spatial resampling of the plurality of pictures with the resampling ratio; wherein the resampling ratio is determined according to one or more spatial information features of a video sequence and a pre-trained cluster model, wherein the one or more spatial information features comprise an amplitude and a slope.

12. A non-transitory computer readable storage medium storing a bitstream of a video for processing according to operations comprising:

determining one or more spatial information feature of a video sequence corresponding to various resolution, wherein the one or more spatial information features comprise an amplitude and a slope;

performing spatial resampling on the video sequence according to the one or more spatial information features and a pre-trained cluster model; and encoding the spatial resampled video sequence into the bitstream.

13. The non-transitory computer readable storage according to claim 12, wherein the operations further comprise:

encoding a parameter indicating a resampling ratio into the bitstream.

14. The non-transitory computer readable storage medium according to claim 12, wherein the operations further comprise:

determining whether to perform the spatial resampling based on a bitrate of the video sequence; and in response to the bitrate is smaller than a threshold value, performing the spatial resampling.

15. The non-transitory computer readable storage medium according to claim 12, wherein the operations further comprise:

determining whether to perform the spatial resampling based on a quantization parameter (QP) of an encoder; and in response to the QP is greater than or equal to a threshold value, performing the spatial resampling.

16. The non-transitory computer readable storage medium according to claim 15, wherein the pre-trained cluster model is constructed by:

obtaining feature data by calculating the one or more spatial information features on a dataset;

obtaining a plurality of cluster centers by performing cluster algorithm on the feature data; and determining, based on the plurality of cluster centers, classes indicating whether to perform the spatial resampling.

17. The non-transitory computer readable storage medium according to claim 16, wherein determining, based on the plurality of cluster centers, the classes indicating whether to perform the spatial resampling, further comprises:

dividing the plurality of cluster centers into a first group and a second group based on a feature distance of each one of the plurality of cluster centers, wherein an average feature distance of a first plurality of cluster centers in the first group is smaller than an average feature distance of a first plurality of cluster centers in the second group;

determining a first plurality of classes corresponding to the first plurality of cluster not to perform the spatial resampling; and determining a second plurality of classes corresponding to the second plurality of cluster to perform the spatial resampling.

18. The non-transitory computer readable storage medium according to claim 17, wherein performing the spatial resampling on the video sequence according to the one or more spatial information features and the pre-trained cluster model further comprises:

determining a class of the video sequence according to the one or more spatial information features of the video sequence and the pre-trained cluster model; and determining whether to perform spatial resampling on the video sequence according to the class.

19. The non-transitory computer readable storage medium according to claim 16, wherein performing the spatial resampling on the video sequence according to the one or more spatial information features and the pre-trained cluster model further comprises:

dividing the plurality of cluster centers into a first group and a second group based on a feature distance of each one of the plurality of cluster centers, wherein an average feature distance of a first plurality of cluster centers in the first group is smaller than an average feature distance of a first plurality of cluster centers in the second group;

calculating distances to each one of the plurality of cluster centers for the video sequence;

obtaining a first distance to be a smallest one among a plurality distances corresponding to the first plurality of cluster centers in the first group, and a second distance to be a largest one among a plurality distances corresponding to the second plurality of cluster centers in the second group; and determining whether to perform the spatial resampling based on a difference between the first distance and the second distance.

* * * * *